United States Patent
Yanagita et al.

(10) Patent No.: US 6,765,694 B1
(45) Date of Patent: Jul. 20, 2004

(54) COLOR IMAGE PROCESSOR

(75) Inventors: Hiromi Yanagita, Tokyo (JP);
Hiroyuki Iwashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/556,623

(22) Filed: Apr. 21, 2000

(30) Foreign Application Priority Data

Apr. 23, 1999 (JP) .......................................... 11-116604

(51) Int. Cl.$^7$ ................................................ G03F 3/08
(52) U.S. Cl. ........................ 358/1.9; 358/523; 358/529
(58) Field of Search ............................... 358/529, 523, 358/1.9

(56) References Cited

U.S. PATENT DOCUMENTS

| | | | | |
|---|---|---|---|---|
| 4,742,400 A | * | 5/1988 | Tsuji ........................... | 358/3.19 |
| 5,383,754 A | | 1/1995 | Sumida et al. ................ | 412/11 |
| 6,456,404 B1 | * | 9/2002 | Furuya et al. .............. | 358/523 |

FOREIGN PATENT DOCUMENTS

| | | |
|---|---|---|
| JP | 6-195503 | 7/1994 |
| JP | 10-51651 | 2/1998 |

* cited by examiner

*Primary Examiner*—Kimberly Williams
*Assistant Examiner*—Michael Burleson
(74) *Attorney, Agent, or Firm*—Foley & Lardner LLP

(57) ABSTRACT

The color image processor in accordance with the invention has a raster circuit 1 for receiving data about an image of multiple gray levels of plural colors, an UCR/BG circuit 2 for decomposing the image data received from the raster circuit 1 by the use of input Raster Operation codes according to color materials of plural colors, rasterizing the image data into a buffer memory 5, and generating black, and a binarization circuit 3 for binarizing raster data about each gray level and converting the data into data about images each having one gray level. If the aforementioned Raster Operation codes are other than Raster Operation codes having a base image, the raster output function, the UCR/BG functions, and the binarization function are performed simultaneously.

6 Claims, 2 Drawing Sheets

COLOR IMAGE PROCESSOR

BACKGROUND OF THE INVENTION

The present invention relates to a color image processor for inputting data about a halftone image of plural colors and performing rasterization.

Generally, colors are represented on colored materials by halftone processing using dithering. Where dithering is employed, binarization is performed by hardware and so the adopted method is to lay periodic rectangular dithered patterns over the whole image. Adoption of this method permits high-speed processing with a small amount of hardware. Accordingly, a full-color image is once rasterized into a memory buffer. After completion of the rasterization, binarization is performed again for the rectangular rasterized region.

With the prior art technique, however, if one attempts to perform a rasterization operation at the stage of two-valued rasterization without impairing the color hues, and if the method consists of two operations (i.e., one operation consists of completing multi-valued rasterization into a buffer memory; another operation is to then perform a binarization operation) is adopted, then two rasterization operations are required. This creates the problem that the processing time is long.

Where one attempts to perform a rasterization operation without impairing the color hues at the stage of two-valued rasterization processing, if binarization is performed after completion of multi-valued rasterization into a buffer memory, it is necessary to load data about the multi-valued image into the memory. Therefore, a large capacity of memory area is necessary for the buffer memory.

SUMMARY OF THE INVENTION

It is an object of the present invention to provide an image processor for realizing high-speed rasterization while maintaining the quality of the output image.

A color image processor in accordance with the present invention comprises an input circuit for receiving a Raster command involving Raster Operation codes and data about an image of multiple gray levels of plural colors, an UCR/BG circuit having UCR/BG functions of decomposing the data about the image of multiple gray levels of plural colors according to individual color materials of plural colors using the Raster Operation codes, rasterizing the decomposed data into a buffer memory, and generating black, and a binarization circuit having functions of binarizing raster data about each gray level and converting the raster data into data images each having one gray level.

Where the above-described Raster Operation codes are other than Raster Operation codes including a base image, the raster output function, the UCR/BG functions, and the binarization function described above are simultaneously performed.

Where an output image to be derived is a two-valued rectangular image, the UCR/BG circuit performs UCR processing on the raster data produced by the input circuit, as well as black generation. The raster data converted and undergone the black generation and the UCR processing are binarized by the binarization circuit and rasterized into the buffer memory.

If the output image to be obtained is a two-valued image and a Raster command involving ROP codes not having a base image as operation elements is received, and if the rasterized image is a rectangular image, then the raster output function, the UCR/BG functions, and the binarization function are not performed separately. Rather, they are performed simultaneously. If ROP codes including a base image are entered, raster data is created. Also, UCR/BG conversion is performed. Then, a binarization process is directly carried out. Data about a two-valued image is rasterized into the buffer memory.

In the present invention, if a Raster command which involves Raster Operation (ROP) codes not having a base image as operation elements is received, pixels are created. Then, UCR/BG conversion is performed, followed by dithering. Binarization is then effected. These steps are carried out in one operation.

DESCRIPTION OF THE PREFERRED EMBODIMENT

Figure 1:
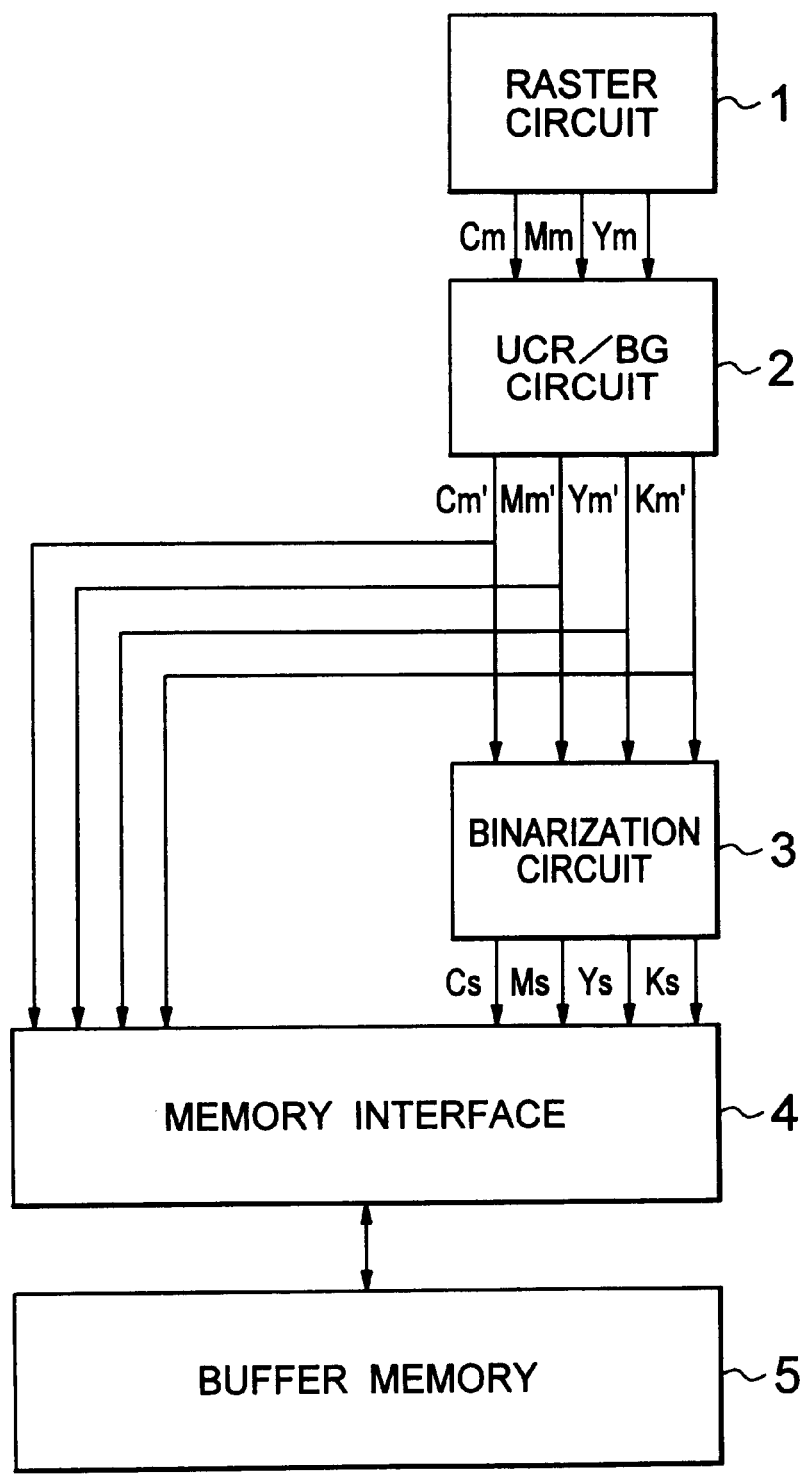
FIG. 1 is a diagram showing the configuration of a color image processor in accordance with the present invention.

An embodiment of the present invention is hereinafter described with reference to the drawings. Referring to FIG. 1, a color image processor in accordance with the present invention comprises a raster circuit 1, an UCR/BG circuit 2, a binarization circuit 3, a memory interface circuit 4, and a buffer memory 5.

Source image data consisting of a Raster command involving Raster Operation (ROP) codes and data about an image of multiple gray levels of plural colors are entered into the UCR/BG circuit 2. Then, the raster circuit 1 delivers data Cm about full-color-cyan image, data Mm about full-color-magenta image, and data Ym about full-color-yellow image.

The data Cm about full-color-cyan image, the data Mm about full-color-magenta image, and the data Ym about full-color-yellow image are supplied to the UCR/BG circuit 2, together with Raster Operation (ROP) codes. The aforementioned full-color image data Cm, Mm, Ym that are input signals are decomposed according to color materials of plural colors so as to be read into the buffer memory 5. That is, the UCR/BG circuit 2 performs UCR/BG processing (processing for generating black and removing gray levels) and produces the results of the processing, i.e., data Cm' about full-color-cyan image, data Mm' about full-color-magenta image, data Ym' about full-color-yellow image, and data Km' about full-color-black image.

The binarization circuit 3 performs dithering by laying rectangular cell patterns periodically over the whole image. The binarization circuit 3 binarizes the full-color image by dithering and produces data Cs about a cyan image of one gray level, data Ms about a magenta image of one gray level, data Ys about a yellow image of one gray level, and data Ks about a black image of one gray level.

Figure 2:
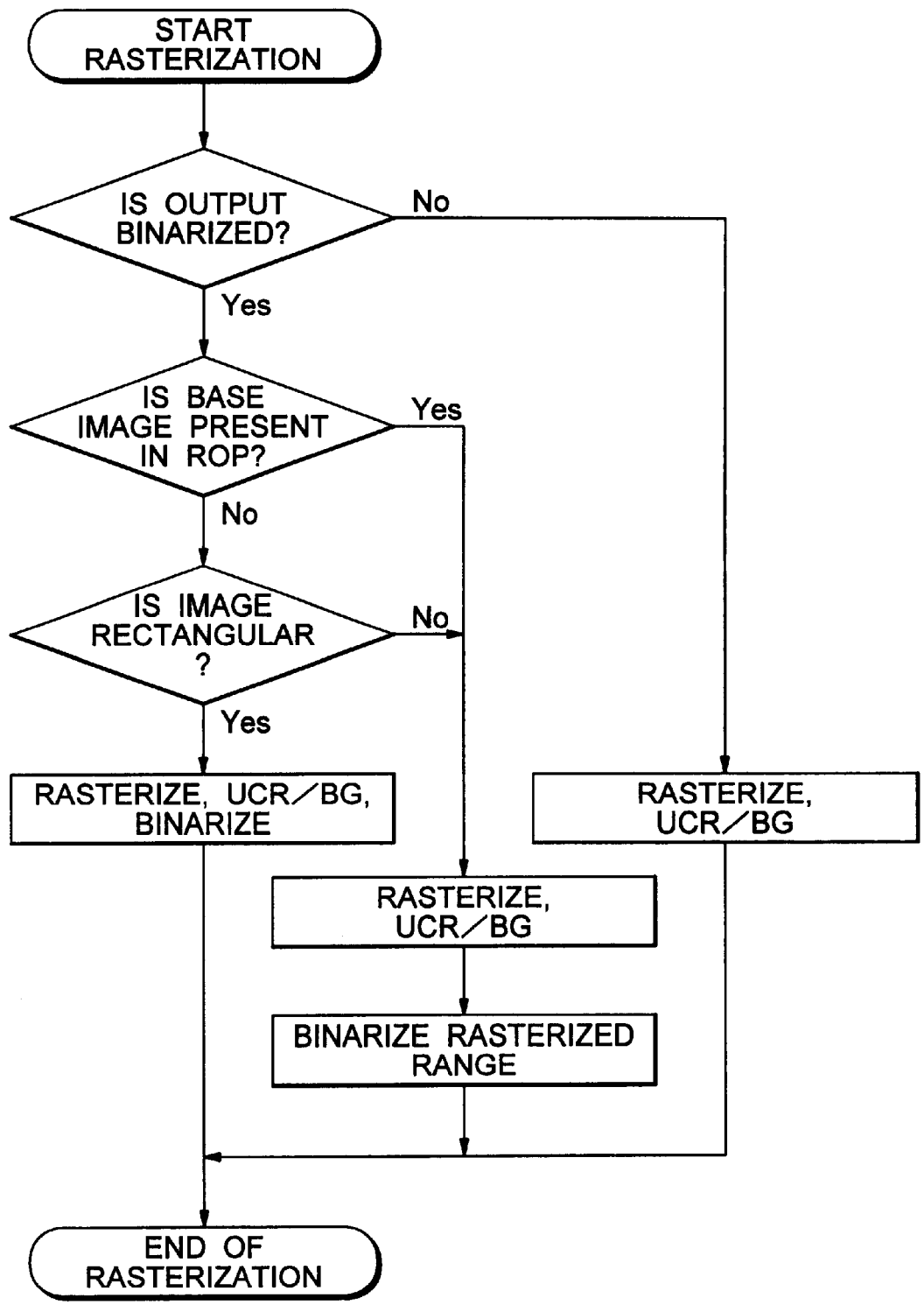
FIG. 2 is a flowchart illustrating the rasterizing algorithm of the color image processor in accordance with the invention for, depicting its operation.

The operation of each constituting circuit of FIG. 1 is described next by referring to FIG. 2. A rasterization operation is roughly classified into three steps. If an output image to be obtained is a multi-valued image, the raster circuit 1 receives a Raster command and creates data Cm, Mm, Ym about full-color image for each individual color material. The data (Cm, Mm, Ym) about full-color image for which black is generated by the UCR/BG circuit 2 are rasterized into the buffer memory 5 via the memory interface circuit 4. In this case, the rasterization operation is completed at this stage.

If the image to be obtained is a two-valued image but not a rectangular image, the raster data (Cm, Mm, Ym) created by the raster circuit 1 are subjected to black generation and UCR processing by the UCR/BG circuit 2. Then, the raster data (Cm, Mm, Ym) are rasterized into the buffer memory 5 in succession for each different object. When the rasterization into the buffer memory 5 is completed, binarization is performed on a newly rasterized rectangular range. This processing is a general, conventional processing.

An effect characteristic of the present invention is obtained by adding the following processing to the processing described above. If an output image to be obtained is two-valued rectangular image, the raster data (Cm, Mm, Ya) generated by the raster circuit 1 are subjected to UCR processing by the UCR/BG circuit 2, as well as to black generation. Then, the raster data (Cm, Mm, Ym) are converted into full-color-cyan image data Cm', full-color-magenta image data Mm', full-color-yellow image data Ym', and full-color black image data Km'. The converted image data (Cm', Mm', Ym', Km') are binarized by the binarization circuit 3 and rasterized into the buffer memory 5.

That is, an operation characteristic of the present invention takes place where the output image is a two-valued image and a Raster command involving Raster Operation (ROP) codes other than Raster Operation codes including a base image is received (in other words, a Raster command involving Raster Operation codes not including the base image as operation elements is received). Where the rasterized image is a rectangular image, the raster output function, the UCR/BG functions, and the binarization function are not performed separately. Rather, they are performed simultaneously. On the other hand, where Raster Operation codes including a base image is entered, raster data is created. After UCR/BG conversion, binarization is directly performed. Then, two-valued image data is rasterized into the buffer memory.

Accordingly, in the present invention, if a Raster command involving Raster Operation codes not including a base image as operation elements is received, pixels are created. Then, UCR/BG is performed. Subsequently, dithering is performed. Thus, the steps up to the binarization are performed in one operation.

In accordance with the present invention, generated raster data is directly binarized and rasterized. Therefore, it is not necessary to once rasterize multi-valued data. Consequently, where two-valued drawing is performed without impairing the color hoes, the image can be drawn at a high speed.

Further, in accordance with the present invention, generated raster data is directly binarized and rasterized. Therefore, it is not necessary to rasterize multi-valued data once. Where a two-valued image is drawn without deteriorating the color hues, rasterization can be performed into a small capacity of memory.

What is claimed is:

1. A color image processor comprising:
   an input circuit for entering a Raster command involving Raster Operation (ROP) codes and data about an image of multiple gray levels of plural colors;
   an UCR/BG circuit having UCR/BG functions of decomposing said image of multiple gray levels according to color materials of plural colors using said ROP codes, producing raster data to a buffer memory, and generating black; and
   a binarization circuit having a function of binarizing the raster data about each gray level and conveying the raster data into data about images each having one gray level;

wherein:
   said input circuit receives said Raster command to produce a full-color image data for each different color, when an output image to be obtained is a multi-valued image, and
   said full-color image data for which black is generated by said UCR/BG circuit being rasterized into said buffer memory via a memory interface circuit;

wherein:
   if an image to be obtained is not a rectangular image but a two-valued image, then said UCR/BG circuit performs black generation and UCR on raster data created by said input circuit,
   said raster data being successively rasterized into said buffer memory for each object, and
   a binarization operation being performed again for a rectangular range rasterized, when the rasterization into said buffer memory is completed.

2. The color image processor as claimed in claim 1, wherein:
   if an image to be obtained is a two-valued, rectangular image, then said UCR/BG circuit performs black generation and UCR on raster data created by said input circuit to produce converted raster data, and said converted raster data are binarized by said binarization circuit and rasterized into said buffer memory.

3. A color image processor comprising:
   an input circuit for entering a Raster command involving Raster Operation (ROP) codes and data about an image of multiple gray levels of plural colors;
   an UCR/BG circuit having UCR/BG functions of decomposing said image of multiple gray levels according to color materials of plural colors using said ROP codes, producing raster data to a buffer memory, and generating black; and
   a binarization circuit having a function of binarizing the raster data about each gray level and converting the raster data into data about images each having one gray level;
   wherein when said ROP codes are other than operation codes including a base image, the function of producing said raster data, the UCR/BG functions, and the binarizing function are performed in one operation;

wherein:
   said input circuit receives said Raster command to produce a full-color image data for each different color, when an output image to be obtained is a multi-valued image, and
   said full-color image data for which black generation performed by said UCR/BG circuit being rasterized into said buffer memory via a memory interface circuit; and wherein:
   if an image to be obtained is not a rectangular image but a two-valued image, then said UCR/BG circuit performs black generation and UCR on raster data created by said input circuit,
   said raster data being successively rasterized into said buffer memory for each object, and
   a binarization operation being performed again for a rectangular range rasterized, when the rasterization into said buffer memory is completed.

4. The color image processor as claimed in claim 3, wherein:

if an image to be obtained is a two-valued, rectangular image, then said UCR/BG circuit performs black generation and UCR (under control removal) on raster data created by said input circuit to produce converted raster data, and said converted raster data are binarized by said binarization circuit and rasterized into said buffer memory.

5. A color image processor comprising:

an input circuit for entering a Raster command involving Raster Operation (ROP) codes and data about an image of multiple gray levels of plural colors;

an UCR/BG circuit having UCR/BG functions of decomposing said image of multiple gray levels according to color materials of plural colors using said ROP codes, producing raster data to a buffer memory, and generating black; and a binarization circuit having a function of binarizing the raster data about each gray level and converting the raster data into data about images each having one gray level;

wherein when said ROP codes are other than operation codes including a base image, the function of producing said raster data, the UCR/BG functions, and the binarizing function are performed in one operation;

wherein:

if an output image to be obtained is a two-valued image and a Raster command involving Raster Operation codes not having a base image as operation elements is received, and if an image to be rasterized is a rectangular image, then said raster output function, the UCR/BG functions, and the binarization function are performed not separately but simultaneously, and if Raster Operation codes having a base image are entered, raster data is created, and UCR/BG conversion is performed, then binarization is directly performed, and data about the two-valued image is rasterized into the buffer memory.

6. The color image processor as claimed in claim 5, wherein:

if a two-valued rectangular image is rasterized with Raster Operation codes not receiving a base image as an input, binarization is directly performed, and two-valued image data is rasterized into said buffer memory, thus saving processing time and used memory.

* * * * *